(12) United States Patent
Jo

(10) Patent No.: US 9,870,458 B2
(45) Date of Patent: *Jan. 16, 2018

(54) CONCEALED DATA MATCHING DEVICE, CONCEALED DATA MATCHING PROGRAM, AND CONCEALED DATA MATCHING METHOD

(71) Applicant: FUJITSU LIMITED, Kawasaki-shi, Kanagawa (JP)

(72) Inventor: Yuka Jo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/353,208

(22) Filed: Nov. 16, 2016

(65) Prior Publication Data
US 2017/0161480 A1 Jun. 8, 2017

(30) Foreign Application Priority Data
Dec. 2, 2015 (JP) .................................. 2015-235843

(51) Int. Cl.
*G06F 7/04* (2006.01)
*G06F 21/32* (2013.01)
(Continued)

(52) U.S. Cl.
CPC .............. *G06F 21/32* (2013.01); *G06F 7/02* (2013.01); *G06F 17/30324* (2013.01); *G06K 2009/00953* (2013.01)

(58) Field of Classification Search
CPC ......... G06F 21/31; G06F 21/575; G06F 21/83
See application file for complete search history.

(56) References Cited

U.S. PATENT DOCUMENTS 6,055,638 A 4/2000 Pascal et al.
8,281,148 B2 * 10/2012 Tuyls .................... H04L 9/3218
380/255
(Continued)

FOREIGN PATENT DOCUMENTS

EP 2824602 A1 1/2015
JP 2009-129292 6/2009
(Continued)

OTHER PUBLICATIONS

Extended European Search Report dated Mar. 30, 2017 in European Application No. 16199076.7.
(Continued)

*Primary Examiner* — Ali Abyaneh
(74) *Attorney, Agent, or Firm* — Staas & Halsey LLP

(57) ABSTRACT

A concealed data matching method for a computer including: registering a first concealed vector obtained by concealing registered data and key data based on a first random number and a linear combination of row vectors of a determination matrix; acquiring a second concealed vector; calculating a remainder vector indicating a remainder obtained by dividing the difference between the first concealed vector and the second concealed vector; determining the similarity between the registered data and the matching data based on the remainder vector; extracting the key data from the remainder vector if it is determined they are similar; calculating an inter-vector distance between the registered data and the matching data; and determining the similarity between the registered data and the matching data based on the magnitude of the inter-vector distance.

6 Claims, 5 Drawing Sheets

(51) Int. Cl.
*G06F 7/02* (2006.01)
*G06F 17/30* (2006.01)
*G06K 9/00* (2006.01)

(56) References Cited

U.S. PATENT DOCUMENTS

| | | | |
|---|---|---|---|
| 8,300,742 B1 | 10/2012 | Bromberg et al. | |
| 8,958,552 B2* | 2/2015 | Hattori | H04L 9/008 380/30 |
| 2010/0040162 A1 | 2/2010 | Suehiro | |
| 2011/0037563 A1 | 2/2011 | Choi et al. | |
| 2011/0185176 A1 | 7/2011 | Takahashi et al. | |
| 2012/0005736 A1 | 1/2012 | Takahashi et al. | |
| 2013/0014270 A1* | 1/2013 | Sy | H04L 9/008 726/26 |
| 2013/0212645 A1 | 8/2013 | Takahashi | |
| 2013/0318351 A1 | 11/2013 | Hirano et al. | |
| 2014/0136094 A1* | 5/2014 | Yasuda | G06F 7/00 701/300 |
| 2014/0325230 A1 | 10/2014 | Sy et al. | |
| 2015/0186629 A1* | 7/2015 | Ishii | G06F 21/31 726/2 |

FOREIGN PATENT DOCUMENTS

| | | |
|---|---|---|
| JP | 2010-108365 | 5/2010 |
| JP | 2010-146245 | 7/2010 |
| JP | 2014-95878 | 5/2014 |
| WO | WO 2012/056582 A1 | 5/2012 |

OTHER PUBLICATIONS

Yuka Sugimura et al., "A Biometric Key-Binding Scheme Using Lattice Masking", 2014 International Conference of the Biometrics Special Interest Group. Gesellschaft für Informatik E.V.—GI), Sep. 10, 2014, pp. 1-4, XP032732032, ISBN: 978-3-88579-624-4.
Extended European Search Report dated Sep. 3, 2014 in corresponding European Patent Application No. 14174932.5, 3 pages.
Extended European Search Report dated Oct. 30, 2015 in corresponding European Patent Application No. 15171160.3, 8 pages.
Korean Office Action dated Aug. 18, 2015 in corresponding Korean Patent Application No. 10-2014-0084388, 3 pages.
Korean Office Action dated May 2, 2016 in corresponding Korean Patent Application No. 10-2015-0086923, 5 pages.
Chinese Office Action dated Oct. 10, 2016 in corresponding Chinese Patent Application No. 201410323274.4, 9 pages.
Rathgeb et al., "A survey on biometric cryptosystems and cancelable biometrics", EURASIP Journal on Information Security, 2011, p. 1-25.
Lee et al., "Biometric Key Binding: Fuzzy Vault Based on Iris Images", ICB 2007, LNCS 4642, 2007, p. 800-808.
Belguechi et al., "Operational bio-hash to preserve privacy of fingerprint minutiae templates", IET Biometrics, 2013, p. 76-84.
Teoh et al., "Cancellable biometrics and annotations on BioHash", Pattern Recognition, 2007, p. 2034-2044.
Juels et al., "A Fuzzy Commitment Scheme", in Proceedings of $6^{th}$ ACM Conference on Computer and Communications Security (ACMCCS '99), 1999, p. 28-36.
Juels et al., "A Fuzzy Vault Scheme", in Proceedings of the IEEE International Symposium on Information Theory, 2002, p. 408.
Jain et al., "Biometric Template Security" (Review Article), EURASIP Journal on Advances in Signal Processing, 2008, p. 1-17.
Sugimura et al., "A proposal of key building technology using lattice masking", The Institute of Electronics, Information and Communication Engineers, Technical Report of IEICE, Section 3 to 4, Jul. 11, 2013, p. 1-8.
Office Action dated Feb. 26, 2016 in co-pending U.S. Appl. No. 14/317,241.
Notice of Allowance dated Jun. 22, 2016 in co-pending U.S. Appl. No. 14/317,241.
Corrected Notice of Allowability dated Jul. 1, 2016 in co-pending U.S. Appl. No. 14/317,241.
Office Action dated Nov. 22, 2016 in co-pending U.S. Appl. No. 14/730,389.
Notice of Allowance dated Jun. 8, 2017 in co-pending U.S. Appl. No. 14/730,389.
U.S. Appl. No. 14/317,241, filed Jun. 27, 2014, Yuka Jo et al., Fujitsu Limited.
U.S. Appl. No. 14/730,389, filed Jun. 4, 2015, Yuka Jo et al., Fujitsu Limited.
Teoh et al., "Cancellable biometrics and annotations on BioHash", Pattern Recognition, 2008, p. 2034-2044.
Chinese Office Action dated Nov. 3, 2017 in corresponding Chinese Patent Application No. 201510345486.7, 11 pages.

* cited by examiner

FIG. 2

$$V = \begin{pmatrix} \overbrace{\begin{matrix} 20 & 0 & 0 \\ 0 & 20 & 0 \\ 0 & 0 & 20 \\ 0 & 0 & 0 \\ 0 & 0 & 0 \end{matrix}}^{\text{MATRIX FOR APPROXIMATE DETERMINATION}} & \overbrace{\begin{matrix} 7 & 5 \\ 4 & 3 \\ 5 & -2 \\ 20000 & -42 \\ 0 & 123 \end{matrix}}^{\text{RANDOM NUMBER VECTORS}} \end{pmatrix}$$

THRESHOLD FOR KEY

FIG. 3

$$\begin{array}{c} V_1 \\ V_2 \\ V_3 \\ V_4 \\ V_5 \end{array} \; V = \begin{pmatrix} 20 & 0 & 0 & 7 & 5 \\ 0 & 20 & 0 & 4 & 3 \\ 0 & 0 & 20 & 5 & -2 \\ 0 & 0 & 0 & 20000 & -42 \\ 0 & 0 & 0 & 0 & 123 \end{pmatrix}$$

CONCEALED DATA MATCHING DEVICE, CONCEALED DATA MATCHING PROGRAM, AND CONCEALED DATA MATCHING METHOD

CROSS-REFERENCE TO RELATED APPLICATION

This application is based upon and claims the benefit of priority of the prior Japanese Patent Application No. 2015-235843, filed on Dec. 2, 2015, the entire contents of which are incorporated herein by reference.

FIELD

The embodiment discussed herein is related to a concealed data matching device, a concealed data matching program, and a concealed data matching method.

BACKGROUND

Biometric authentication is a personal authentication technique using information on physical and behavioral characteristics of persons. The physical characteristics include fingerprints, veins, irises, and DNAs, for example. The behavioral characteristics include handwriting, for example. The biometric authentication is executed by acquiring biometric information called a template in advance and comparing the biometric information with information acquired by a sensor upon matching.

In recent years, attention has been paid to a biometric authentication technique for comparing information obtained by converting a template and stored in a database with biometric information without the restoration of the converted information to the original template upon matching. This biometric authentication technique is referred to as a "template-protected biometric authentication technique". In a system using the template-protected biometric authentication technique, even if a converted template leaks, a conversion method is changed to another method that makes the leaked template unusable and avoids access to the leaked template.

As template-protected biometric authentication techniques, template protection schemes that are referred to as key binding schemes are known. As one of the key binding schemes, there is a key binding scheme by lattice element addition. In the key binding scheme by lattice element addition, a determination matrix that includes a threshold to be used to determine the similarity between data to be matched and registered data is defined in advance, for example. In the key binding scheme by lattice element addition, a template is generated by using the determination matrix or the like to conceal biometric information to be registered, and the determination matrix and the template are stored in a database. In the key binding scheme by lattice element addition, data is generated by using the determination matrix or the like to conceal biometric information to be matched, and a remainder vector that indicates a remainder obtained by division using the determination matrix as a divisor is calculated from the generated data and the template. Then, in the key binding scheme by lattice element addition, whether or not the biometric information to be matched is sufficiently close to the registered biometric information is determined. Examples of related art are Japanese Laid-open Patent Publication No. 2010-108365, Japanese Laid-open Patent Publication No. 2010-146245, Japanese Laid-open Patent Publication No. 2014-95878, and International Publication Pamphlet No. WO2012/056582.

In the conventional key binding scheme by lattice element addition, the registered biometric information and the biometric information to be matched are expressed by vectors, and the determination is made using the following standard: if "the biometric information to be matched is sufficiently close to the registered biometric information", "differences between components of the vectors are equal to or smaller than a threshold". On the other hand, in biometric authentication, standards that are different for types of biometric information and are, for example, Hamming distances between vectors, square norm distances between the vectors, and the like are used for the determination of similarities between the biometric information without the use of differences between components of the vectors in general.

In the conventional key binding scheme by lattice element addition, however, various standards that are different for types of biometric information are not supported, types of biometric information that are applicable are limited, and if a standard is forcibly applied, the accuracy of the authentication may be reduced.

The aforementioned problems may occur not only in the authentication of biometric information but also in general authentication executed based on similarities between data to be matched and registered data. The data to be matched and the registered data may be numerical information such as positional information or confidential information.

According to one aspect, an object is to provide a concealed data matching device, a concealed data matching program, and a concealed data matching method that may improve the accuracy of authentication.

SUMMARY

According to an aspect of the invention, a concealed data matching method for a computer including: registering a first concealed vector obtained by concealing registered data and key data based on a first random number and a linear combination of row vectors of a determination matrix; acquiring a second concealed vector; calculating a remainder vector indicating a remainder obtained by dividing the difference between the first concealed vector and the second concealed vector; determining the similarity between the registered data and the matching data based on the remainder vector; extracting the key data from the remainder vector if it is determined they are similar; calculating an inter-vector distance between the registered data and the matching data; and determining the similarity between the registered data and the matching data based on the magnitude of the inter-vector distance.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram describing an approximate determination matrix according to the embodiment;

FIG. 3 is a diagram describing row vectors corresponding to the approximate determination matrix according to the embodiment;

DESCRIPTION OF EMBODIMENT

Hereinafter, an embodiment of a concealed data matching device disclosed herein, a concealed data matching program disclosed herein, and a concealed data matching method disclosed herein is described with reference to the accompanying drawings. The concealed data matching device uses a key binding scheme by lattice element addition that is one of template-protected biometric authentication techniques. The present disclosure is not limited by the embodiment.

Configuration of Concealed Data Matching Device

Figure 1:
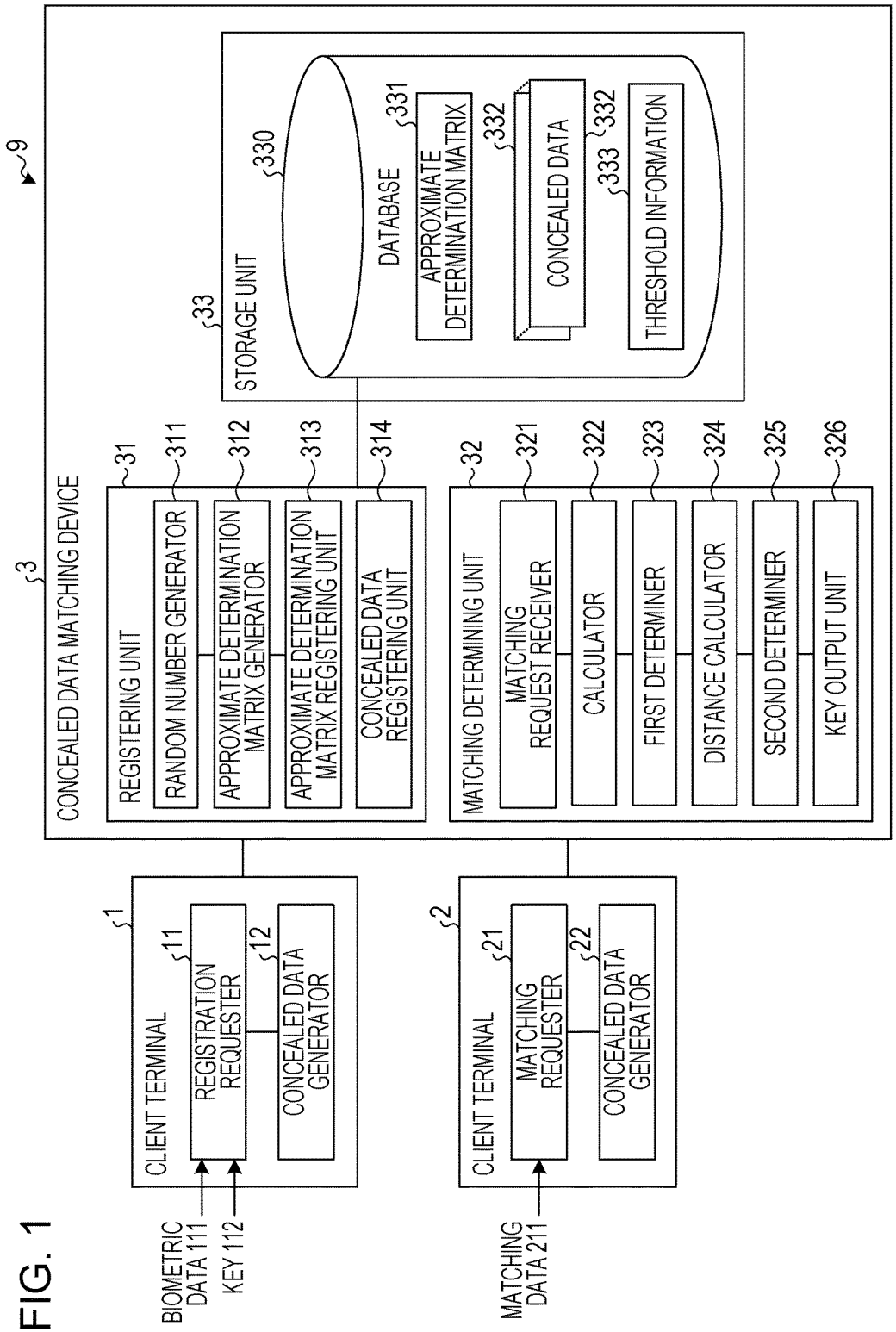
FIG. 1 is a diagram describing an example of a functional configuration of a concealed data matching system according to an embodiment.

FIG. 1 is a diagram describing an example of a functional configuration of a concealed data matching system according to the embodiment. As illustrated in FIG. 1, a concealed data matching system 9 includes client terminals 1 and 2 and a concealed data matching device 3. The concealed data matching device 3 includes a database 330. The concealed data matching device 3 and the client terminals 1 and 2 are connected to each other via a network.

The concealed data matching system 9 conceals biometric data of a client and key data specific to the client based on a special random number (lattice element) called lattice masking and registers first concealed data obtained by concealing the biometric data and the key data in the database 330. Then, when receiving a request to crosscheck the biometric data, the concealed data matching system 9 conceals the biometric data using a different lattice element and obtains second concealed data by concealing the biometric data using the different lattice element. Then, the concealed data matching system 9 uses a map specific to the lattice theory to determine, based on the difference between the first concealed data and the second concealed data, whether or not the biometric data corresponding to the first concealed data is approximate to (or similar to) the biometric data corresponding to the second concealed data. Then, if the concealed data matching system 9 determines that the biometric data corresponding to the first concealed data is approximate to the biometric data corresponding to the second concealed data, the concealed data matching system 9 extracts the key data from the difference between the first concealed data and the second concealed data. In addition, if the concealed data matching system 9 determines that the biometric data corresponding to the first concealed data is approximate to the biometric data corresponding to the second concealed data, the concealed data matching system 9 calculates an inter-vector distance between the biometric data corresponding to the first concealed data and the biometric data corresponding to the second concealed data. The concealed data matching system 9 determines the similarity between the biometric data based on the magnitude relationship between the calculated inter-vector distance and an authentication threshold. If the concealed data matching system 9 determines that the biometric data corresponding to the first concealed data is approximate to the biometric data corresponding to the second concealed data, the concealed data matching system 9 outputs the extracted key data to a source of the request. The embodiment assumes that the client terminal 1 is a terminal of the client whose biometric data is registered and that the client terminal 2 is a terminal that requests biometric data to be matched. The concealed data matching system 9 may include a plurality of client terminals 1. The concealed data matching system 9 may include a plurality of client terminals 2.

Details of the concealment of the biometric data and the key data specific to the client by the concealed data matching device 9, and details of the approximate determination of the concealed data by the concealed data matching device 9, are described below.

The client terminal 1 includes a registration requester 11 and a concealed data generator 12.

The registration requester 11 requests the concealed data matching device 3 to register biometric data 111 and a key 112. For example, the registration requester 11 receives the biometric data 111 and the key 112 from an external terminal. Then, the registration requester 11 requests the concealed data matching device 3 to register the received biometric data 111 and the received key 112. The external terminal may be a terminal connected to the client terminal 1 via the network.

The biometric data 111 is data on physical or behavioral characteristics of the client. Examples of the data on the physical characteristics are a fingerprint, a vein, irises, and a DNA. An example of the data on the behavioral characteristics is handwriting. The embodiment assumes that the biometric data 111 is expressed by a vector having an n-dimensional component. The key 112 is key data requested by the client to be registered together with the biometric data 111. The embodiment assumes that the key 112 is expressed by a value, for example.

In addition, the registration requester 11 receives, from the concealed data matching device 3, a linear combination (lattice element) corresponding to an approximate determination matrix 331 (described later) as a response to the registration request and outputs the received lattice element to the concealed data generator 12. When receiving a concealed vector obtained by concealing the biometric data 111 and the key 112 from the concealed data generator 12, the registration requester 11 requests the concealed data matching device 3 to register the concealed vector.

The concealed data generator 12 generates the concealed vector obtained by concealing the biometric data 111 and the key 112.

For example, the concealed data generator 12 generates, for the biometric data 111 and the key 112, an (n+2)-dimensional vector obtained by attaching, to data obtained by combining the biometric data 111 and the key 112, "0" as the last component of the combined data. Specifically, the concealed data generator 12 generates the (n+2)-dimensional vector obtained by attaching a one-dimensional component included in the key 112 and "0" as an (n+2)-th component to the n-dimensional component included in the biometric data 111. As an example, it is assumed that the biometric data 111 is T indicating the n-dimensional component and that the key 112 is K indicating the one-dimensional component. In this case, the concealed data generator 12 generates an (n+2)-dimensional vector [T, K, 0].

The linear combination (lattice element) received from the concealed data matching device 3 and corresponding to the approximate determination matrix 331 is an (n+2)-dimensional vector, as described later. When receiving the linear combination (lattice element) from the registration requester 11, the concealed data generator 12 generates a random number. Then, the concealed data generator 12 generates a concealed vector obtained by adding the generated (n+2)-dimensional vector to the product of the linear combination (lattice element) and the random number. As an example, if the random number is $r_1$ and the (n+2)-dimensional lattice element is $b_1$, the concealed vector is expressed by [T, K, 0]+$r_1 \times b_1$. Then, the concealed data generator 12 outputs the generated concealed vector to the registration requester 11.

The client terminal 2 includes a matching requester 21 and a concealed data generator 22.

The matching requester 21 requests the concealed data matching device 3 to crosscheck the biometric data. The biometric data requested to be matched is referred to as matching data 211. The embodiment assumes that the matching data 211 is expressed by a vector having an n-dimensional component. In addition, the matching requester 21 receives, from the concealed data matching device 3, a linear combination (lattice element) corresponding to the approximate determination matrix 331 (described later) as a response to the matching request and outputs the received lattice element to the concealed data generator 22. When receiving a concealed vector obtained by concealing the matching data 211 from the concealed data generator 22, the matching requester 21 requests the concealed data matching device 3 to crosscheck the concealed vector. The lattice element received from the concealed data matching device 3 is different from the lattice element received by the registration requester 11 of the client terminal 1 upon the registration.

The concealed data generator 22 generates the concealed vector obtained by concealing the matching data 211.

For example, the concealed data generator 22 generates an (n+2)-dimensional vector obtained by attaching "0s" as the last and second last components of the matching vector to the matching data 211. Specifically, the concealed data generator 22 generates the (n+2)-dimensional vector obtained by attaching "0s" as the (n+1)-dimensional component and the (n+2)-dimensional component to the n-dimensional component included in the matching data 211. As an example, it is assumed that the matching data 211 is Q indicating the n-dimensional component. In this case, the concealed data generator 22 generates an (n+2)-dimensional vector [Q, 0, 0].

When acquiring the linear combination (lattice element) from the matching requester 21, the concealed data generator 22 generates a random number. Then, the concealed data generator 22 generates a concealed vector obtained by adding the generated (n+2)-dimensional vector to the product of the linear combination (lattice element) and the random number. As an example, if the random number is $r_2$ and the (n+2)-dimensional lattice element is $b_2$, the concealed vector is expressed by [Q, 0, 0]+$r_2 \times b_2$. Then, the concealed data generator 22 outputs the generated concealed vector to the matching requester 21. Methods of generating the random numbers are arbitrary. It is, however, desirable that parameters be different from each other in order to inhibit the random numbers generated by the client terminals 1 and 2 from being equal to each other.

The concealed data matching device 3 includes a registering section 31, a matching determining section 32, and a storage section 33. The registering section 31 generates an approximate determination matrix described later and registers the generated approximate determination matrix in a database 330 included in the storage section 33. In addition, the registering section 31 registers concealed data requested to be registered in the database 330 included in the storage section 33. The matching determining section 32 crosschecks the data obtained by concealing the matching data requested to be matched with the registered concealed data and determines whether or not the data obtained by concealing the matching data is approximate to the registered concealed data.

The storage section 33 is a storage device such as a hard disk or an optical disc. The storage section 33 may be a rewritable semiconductor memory such as a random access memory (RAM), a read only memory (ROM), a flash memory, or a nonvolatile static random access memory (NVSRAM).

The storage section 33 includes the database 330. The approximate determination matrix 331, concealed data 332, and threshold information 333 are stored in the database 330. The approximate determination matrix 331 and the concealed data 332 are registered by the registering section 31 described later. Details of the approximate determination matrix 331 are described later. The threshold information 333 is data storing an authentication threshold to be used to determine the similarity between the matching data and the registered data based on an inter-vector distance between the matching data and the registered data. The authentication threshold stored in the threshold information 333 may be changed by an external terminal device or the like.

The registering section 31 includes a random number generator 311, an approximate determination matrix generator 312, an approximate determination matrix registering section 313, and a concealed data registering section 314.

The random number generator 311 generates random numbers to be used for the approximate determination matrix 331 and outputs the generated random numbers to the approximate determination generator 312. The random numbers to be used for the approximate determination matrix 331 are attached as the last and second last columns of a square matrix to the square matrix indicating thresholds for an approximate range upon the generation of the approximate determination matrix 331. The thresholds for the approximate range are values set as the approximate range by the client and is information indicating the lengths of dimensions of a vector for the approximate range. For example, if the biometric data is three-dimensional data (n=3), and the thresholds for the approximate range of components of the biometric data are "e, f, and g", the random number generator 311 generates, as components of the second last column, random numbers $h_1$, $i_1$, and $j_1$ satisfying $e/2 \geq h_1$, $f/2 \geq i_1$, and $g/2 \geq j_1$. In addition, if a threshold for the key 112 described later is "k", the random number generator 311 generates an arbitrary random number "m" and random numbers "$h_2$, $i_2$, $j_2$, and l" that are used as components of the last column and satisfy $e/2 \geq h_2$, $f/2 \geq i_2$, and $g/2 \geq j_2$, and $k/2 \geq l$.

The approximate determination matrix generator 312 generates the approximate determination matrix 331 to be used to make approximate determination. The approximate determination matrix generator 312 generates a different approximate determination matrix 331 for each system that includes the concealed data matching device 3.

For example, the approximate determination matrix generator 312 generates a diagonal matrix having diagonal elements indicating the thresholds for the approximate range and having other elements indicating "0". As an example, if biometric data to be subjected to the determination is information having n components, that is, the biometric data 111 is n-dimensional information, the approximate determination matrix generator 312 generates an n×n diagonal matrix. In addition, the approximate determination matrix generator 312 sets the threshold for the key 112 in a component at an (n+1)-th row and an (n+1)-th column. The threshold for the key 112 is information indicating the maximum value among values that are able to be set as the key 112 by the client.

Then, the approximate determination matrix generator 312 generates an (n+2)×n matrix obtained by attaching two rows with all elements indicating "0" to the generated n×n diagonal matrix so that the attached two rows are the last and second last rows of the (n+2)×n matrix. Then, the approximate determination matrix generator 312 generates a random number vector having n components whose number n is the same as the number n of rows of the diagonal matrix. The approximate determination matrix generator 312 generates a random number vector having n+2 components whose number n+2 (indicating the final number of rows) is obtained by adding 2 to the number n of the rows of the diagonal matrix. In the components of the random number vectors, random numbers generated by the random number generator 311 are set. Then, the concealed data matching device 3 generates, as the approximate determination matrix 311, an (n+2)×(n+2) square matrix having the random number vectors attached thereto.

The approximate determination matrix registering section 313 registers the approximate determination matrix 331 generated by the approximate determination matrix generator 312 in the database 330.

The approximate determination matrix 331 is described with reference to FIG. 2. FIG. 2 is a diagram describing the approximate determination matrix according to the embodiment. In an example illustrated in FIG. 2, biometric data and an approximate range are expressed by three-dimensional values. As illustrated in FIG. 2, an approximate determination matrix V that corresponds to the approximate determination matrix 331 is a matrix obtained by attaching the threshold for the key and random number vectors to a matrix for the approximate determination.

The matrix for the approximate determination has, as diagonal elements, thresholds indicating the lengths of vectors of the approximate range in each dimension. For example, in the example illustrated in FIG. 2, if the biometric data is three-dimensional data [x, y, z], the first row of the matrix for the approximate determination indicates that the length of the approximate range in x-axis direction is "20", the second row of the matrix for the approximate determination indicates that the length of the approximate range in y-axis direction is "20", and the third row of the matrix for the approximate determination indicates that the length of the approximate range in z-axis direction is "20". Specifically, the matrix for the approximate determination that is illustrated in FIG. 2 is used to determine whether or not the biometric data to be matched and the registered biometric data are in a range of "±10" in x-axis direction, "±10" in y-axis direction, and "±10" in z-axis direction.

In the fourth row for the insertion of the key, "0, 0, 0" are added. In the fourth column, a random number vector "7, 4, 5" and the threshold "20000" or "7, 4, 5, 20000" are added. In the fifth row or the last row, "0, 0, 0, 0" are added. In the fifth column or the last column, a random number vector "5, 3, –2, –42, 123" is added. In the example illustrated in FIG. 2, the approximate range is expressed by the three-dimensional values. The embodiment, however, is not limited to this, and the approximate range may be expressed by arbitrary-dimensional values.

The concealed data registering section 314 registers concealed data in the database 330. The registered concealed data corresponds to a template protected in the key binding scheme.

For example, if the client terminal 1 requests the concealed data matching device 3 to register the biometric data 111 and the key 112, the concealed data registering section 314 generates random numbers for the linear combinations corresponding to the approximate determination matrix 331. As an example, the concealed data registering section 314 acquires row vectors $v_1, v_2, \ldots,$ and $v_{n+2}$, each of which has n+2 components and corresponds to the approximate determination matrix 331. FIG. 3 is a diagram describing the row vectors corresponding to the approximate determination matrix according to the embodiment. For example, if the approximate determination matrix 331 is a 5×5 matrix as illustrated in FIG. 3, the concealed data registering section 314 acquires row vectors $v_1, v_2, \ldots,$ and $v_5$, each of which has, as components, a row of the approximate determination matrix 331. The concealed data registering section 314 selects certain integers $c_1, c_2, \ldots,$ and $c_{n+2}$ for the row vectors $v_1, v_2, \ldots,$ and $v_{n+2}$. Specifically, the concealed data registering section 314 selects the integers whose number is the same as the number of the row vectors. Then, the concealed data registering section 314 calculates, as a linear combination, an (n+2)-dimensional vector expressed by the sum of products of the row vectors and the integers or $c_1 \times v_1 + c_2 \times v_2 + \ldots + c_{n+2} \times v_{n+2}$. The linear combination is the "lattice element". For each of the registered biometric data, the concealed data registering section 314 selects a combination of different integers $c_1, c_2, \ldots,$ and $c_{n+2}$ and calculates a linear combination that is the sum of products of the selected integers and the row vectors of the approximate determination matrix 331.

In addition, the concealed data registering section 314 distributes, to the client terminal 1, the corresponding calculated linear combination or the lattice element as a response to the registration request. Then, if the client terminal 1 requests the concealed data matching device 3 to register the concealed data 332, the concealed data registering section 314 registers the requested concealed data 332 in the database 330.

The matching determining section 32 includes a matching request receiver 321, a calculator 332, a first determiner 323, a distance calculator 324, a second determiner 325, and a key output section 326.

When receiving a matching request from the client terminal 2, the matching request receiver 321 generates random numbers for the linear combination (lattice element) corresponding to the approximate determination matrix 331. The random numbers for the linear combination are generated in a manner that is the same as or similar to the generation by the concealed data registering section 314. Thus, a description of the generation of the random numbers for the linear combination is omitted. The lattice element generated by the matching request receiver 321 is different from the lattice element generated by the concealed data registering section 314 upon the registration.

In addition, the matching request receiver 321 distributes, to the client terminal 2, the corresponding calculated linear combination or the lattice element as a response to the matching request. Then, when the client terminal 2 requests the concealed data matching device 3 to crosscheck the concealed vector obtained by concealing the matching data 211, the matching request receiver 321 outputs the concealed vector requested to be matched to the calculator 322.

The calculator 322 calculates a differential vector between the concealed data 332 (concealed vector) registered in the database 330 and the concealed vector obtained by concealing the matching data 211 and received from the client terminal 2. Then, the calculator 322 calculates a remainder vector that indicates a remainder obtained by dividing the calculated differential vector by the approximate determination matrix 331. For example, the calculator 322 executes modular arithmetic or divides the calculated differential vector by the approximate determination matrix 331 to calculate the remainder vector. As an example, if the differential vector is z and the approximate determination matrix 331 is V, the remainder vector is expressed by "z mod V". Then, the calculator 322 outputs the calculated remainder vector to the first determiner 323.

The first determiner 323 determines whether or not the last component of the remainder vector received from the calculator 322 is "0". If the last component of the remainder vector is "0", the first determiner 323 determines that the registered biometric data 111 of the client is approximate to the matching data 211. On the other hand, if the last component of the remainder vector is not "0", the first determiner 323 determines that the registered biometric data 111 of the client is not approximate to the matching data 211.

If the first determiner 323 determines that the registered biometric data 111 of the client is approximate to the matching data 211, the key output section 326 extracts the key 112 of an (n+1)-th component from the remainder vector.

If the first determiner 323 determines that the registered biometric data 111 of the client is approximate to the matching data 211, the distance calculator 324 calculates the inter-vector distance between the registered biometric information and the biometric information to be matched. For example, the distance calculator 324 extracts components related to the biometric information and included in the remainder vector and calculates, as the inter-vector distance, a square norm distance that is indicated by the sum of squares of the components. The inter-vector distance is not limited to the square norm distance and may be a Hamming distance, a Manhattan distance, or a distance that is the weighted sum of the components.

The second determiner 325 determines the similarity between the registered biometric data 111 of the client and the matching data 211 based on the magnitude relationship between the inter-vector distance calculated by the distance calculator 324 and the authentication threshold stored in the threshold information 333. For example, if the inter-vector distance is equal to or smaller than the authentication threshold, the second determiner 325 determines that the registered biometric data 111 of the client is approximate to the matching data 211. On the other hand, if the inter-vector distance is larger than the authentication threshold, the second determiner 325 determines that the registered biometric data 111 of the client is not approximate to the matching data 211.

If the first and second determiners 323 and 325 determine that the registered biometric data 111 of the client is approximate to the matching data 211, the key output section 326 transmits the extracted key 112 to the client terminal 2 that requested the matching.

The principles of the approximate determination made by the matching determining section 32 are described below. The approximate determination matrix 331 is described as an approximate determination matrix V. A linear combination of the row vectors $v_1, v_2, \ldots,$ and $v_{n+2}$ of the approximate determination matrix V may be expressed by a set L (lattice L) based on the linear combination $c_1 \times v_1 + c_2 \times v_2 + \ldots + c_{n+2} \times v_{n+2}$ of the row vectors of the approximate determination matrix V. Specifically, the linear combination of the row vectors of the approximate determination matrix V corresponds to an intersection on the lattice composed of elements of the set L.

A concealed vector H obtained by concealing the n-dimensional biometric data T and the key K is expressed by the following Equation (1) using the lattice element $b_1$ of the set L and the random number $r_1$. [T, K, 0] indicates an (n+2)-dimensional vector obtained by attaching the key K and "0" as an (n+2)-th component to the biometric data T.

$$H = [T, K, 0] + r_1 \times b_1 \qquad \text{Equation (1)}$$

In addition, a concealed vector H' obtained by concealing n-dimensional matching data Q is expressed by the following Equation (2) using the lattice element $b_2$ of the set L and the random number $r_2$. [Q, 0, 0] indicates an (n+2)-dimensional vector obtained by attaching "0s" as an (n+1)-th component and an (n+2)-th component to the matching data Q. In addition, $b_2$ is different from $b_1$.

$$H' = [Q, 0, 0] + r_2 \times b_2 \qquad \text{Equation (2)}$$

In this case, a differential vector z between the concealed vectors H and H' is expressed by the following Equation (3).

$$z = H - H' = [T - Q, K, 0] + r_1 \times b_1 - r_2 \times b_2 \qquad \text{Equation (3)}$$

In this case, $(r_1 \times b_1 - r_2 \times b_2)$ that is included in the differential vector z is the difference between the products of the elements of the set L and the random numbers and is included in the elements of the set L. In other words, $(r_1 \times b_1 - r_2 \times b_2)$ corresponds to any of intersections on the lattice composed of the elements of the set L. In addition, if a remainder vector of the differential vector z is calculated by the approximate determination matrix V, (z mod V) corresponds to the fact that the differential vector z is mapped to a fundamental domain P(L) defined by the set L. Thus, if the remainder vector of the differential vector z is calculated by the approximate determination matrix V, $(r_1 \times b_1 - r_2 \times b_2)$ is ignored. Thus, when z mod V is calculated, a lattice portion including components of the differential vector z and excluding an edge component of the differential vector z is ignored, and only a single lattice including the edge component of the differential vector z is mapped to the fundamental domain P(L). Specifically, z mod V is expressed by the following Equation (4).

$$z \bmod V = [T - Q, K, 0] \bmod V \qquad \text{Equation (4)}$$

If the vector [T−Q, K, 0] is included in the fundamental domain P(L) or the biometric data T is approximate to the matching data Q, z mod V=[T−Q, K, 0]. As a result, if the biometric data T is approximate to the matching data Q, the probability at which the last component of (z mod V) is "0" is very high.

On the other hand, if the vector [T−Q, K, 0] is not included in the fundamental domain P(L) or the biometric data T is not approximate to the matching data Q, there is a certain lattice element b belonging to the set L, z mod V=[T, Q, K, 0]+b. As a result, if the biometric data T is not approximate to the matching data Q, the probability at which the last component of (z mod V) is not "0" is very high.

Under the aforementioned principles, the matching determining section 32 calculates the remainder vector of the differential vector z between the concealed vectors by the approximate determination matrix V and may make the approximate determination on the concealed biometric data based on the last component of the calculated remainder vector.

Next, relationships between the thresholds specified as the approximate range in the diagonal elements of the approximate determination matrix 331 and the authentication threshold stored in the threshold information 333 are described. The data 332 is concealed based on the lattice element distributed to the client terminal 1 and is generated corresponding to the approximate determination matrix 331. Thus, in the concealed data matching system 9, if the approximate determination matrix 331 is changed after being determined, the registered concealed data 332 has to be regenerated corresponding to the approximate determination matrix 331 and registered. Thus, in the concealed data matching system 9, it takes time and effort to change the approximate determination matrix 331 and it is difficult to change the approximate determination matrix 331.

In the concealed data matching system 9, if the thresholds of the diagonal elements of the approximate determination matrix 331 are set to small values, the approximate range is set to be small, and there is a small difference between the matching data and the registered data, the matching data and the registered data are determined to be different from each other and a security level is improved. The biometric information to be used as the matching data and the registered data may include an error or the like, depending on a situation upon the acquisition of the biometric information. For example, if a fingerprint is acquired from a finger of a person as biometric information, the fingerprint may be wholly misaligned and read due to an error in an angle, an orientation, or the like of the finger placed on a reading surface, or a feature point of a part of the fingerprint may not be read due to such an error. Thus, if the approximate range of the approximate determination matrix 331 is set to be small, data to be matched acquired from a person, and registered data acquired from the same person, may be determined as data acquired from different persons.

Thus, in the concealed data matching system 9, the thresholds of the diagonal elements of the approximate determination matrix 331 are set to relatively large values, and the approximate range is set to be relatively large. For example, in the concealed data matching system 9, even if read data includes an error, the approximate range of the approximate determination matrix 331 is set so that data to be matched that is acquired from a person is determined to be similar to registered data acquired from the same person. For example, in the concealed data matching system 9, values that are treated as values in an acceptable error range are specified as the thresholds of the diagonal elements of the approximate determination matrix 331.

If the approximate range of the approximate determination matrix 331 is set to be relatively large, biometric information acquired from a person may be determined to be similar to biometric information acquired from another person. Thus, in the concealed data matching system 9, the authentication threshold stored in the threshold information 333 is changed based on a security level to be ensured. For example, in the concealed data matching system 9, as the security level of the authentication is increased, the authentication threshold is reduced. In this case, in the concealed data matching system 9, the authentication threshold stored in the threshold information 333 is changed based on the security level to be ensured, and the security level of the authentication may be flexibly changed.

Figure 4:
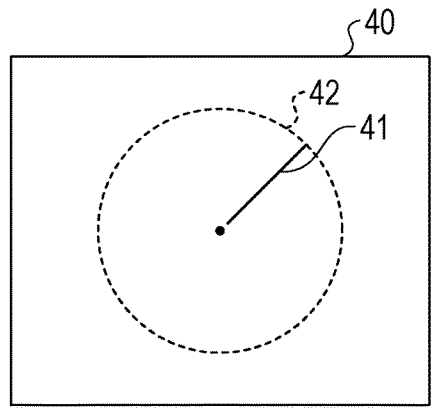
FIG. 4 is a diagram describing the relationship between an approximate range of the approximate determination matrix according to the embodiment and a threshold.

FIG. 4 is a diagram describing the relationship between the approximate range of the approximate determination matrix according to the embodiment and the authentication threshold. In FIG. 4, an approximate range 40 of an approximate determination matrix and a range 42 based on an authentication threshold 41 are schematically illustrated. For example, the thresholds of the diagonal elements of the approximate determination matrix 331 are set to the values that are treated as values in the acceptable error range. Thus, if the difference between the matching data and the registered data is in the approximate range 40, the first determiner 323 determines that the matching data is approximate to the registered data. In addition, the authentication threshold 41 is changed to a value in the approximate range 40 based on a security level to be ensured. If the difference between the matching data and the registered data is in the range 42, the second determiner 325 determines that the matching data is approximate to the registered data. In the concealed data matching system 9, it is difficult to change the approximate determination matrix 331, and the approximate range 40 of the approximate determination matrix 331 is treated as the acceptable error range, regardless of the type of the biometric information. In the concealed data matching system 9, the authentication threshold 41 is changed based on the type of the biometric information. Thus, the concealed data matching system 9 may support the authentication of biometric information of various types and may improve the accuracy of the authentication. In the concealed data matching system 9, it is difficult to change the approximate determination matrix 331, but the authentication threshold 41 may be changed and the security level of the authentication may be flexibly changed.

Sequence of Process of Registering Concealed Data

Figure 5:
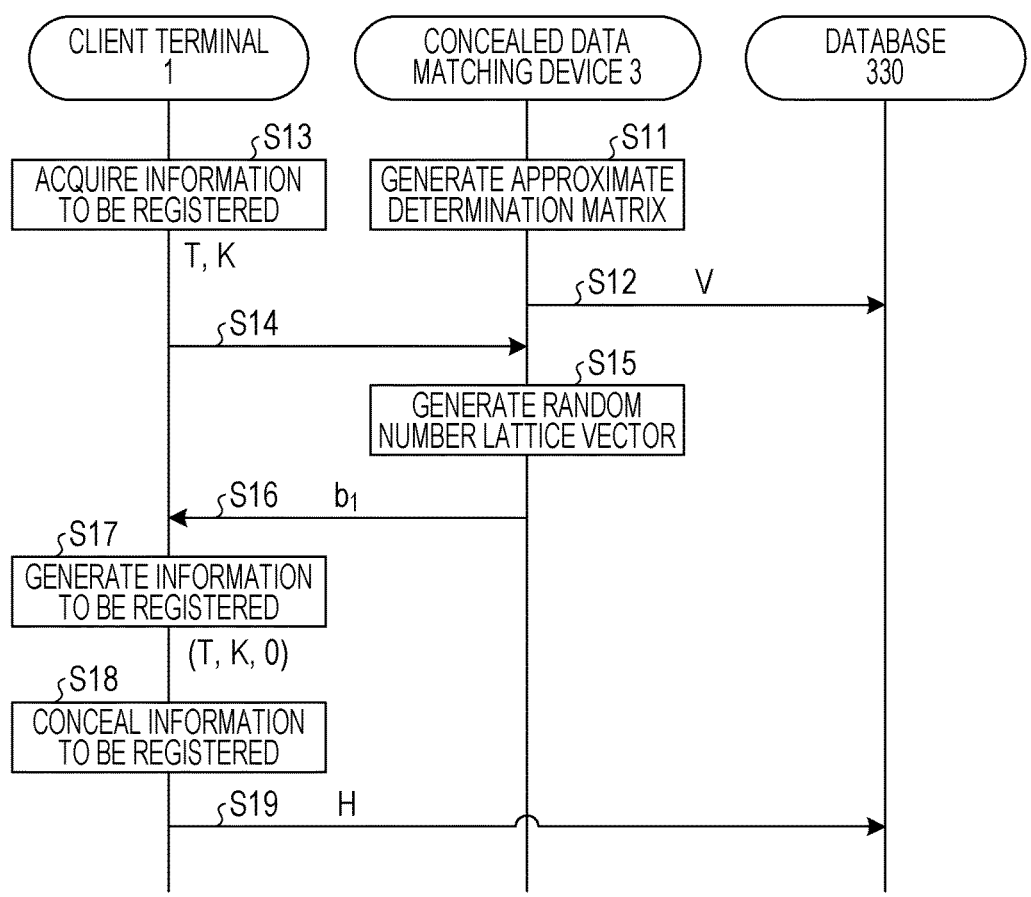
FIG. 5 is a diagram illustrating a sequence of a process of registering concealed data according to the embodiment.

Next, a sequence of a process of registering concealed data is described with reference to FIG. 5. FIG. 5 is a diagram illustrating the sequence of the process of registering concealed data according to the embodiment. In FIG. 5, the biometric data 111 of the client is indicated by T, the key 112 specific to the client is indicated by K, the approximate determination matrix 331 is indicated by V, and a concealed vector is indicated by H.

In the concealed data matching device 3, the approximate determination matrix generator 312 generates the approximate determination matrix V (in step S11). Then, the approximate determination matrix registering section 313 registers the generated approximate determination matrix V in the database 330 (in step S12).

In the client terminal 1, the registration requester 11 acquires information to be registered (in step S13). In this case, the registration requester 11 acquires the biometric data T and the key K as the information to be registered. Then, the registration requester 11 requests the concealed data matching device 3 to register the biometric data T and the key K (in step S14).

In the concealed data matching device 3, the concealed data registering section 314 that received the registration request from the client terminal 1 generates a random number lattice vector (in step S15). In this case, the registering section 314 calculates a linear combination expressed by the sum of products of row vectors of the approximate determination matrix V and certain integers. The calculated linear combination is the random number lattice vector $b_1$ and is the lattice element. Then, the concealed data registering section 314 transmits the calculated random number lattice vector (lattice element) $b_1$ to the client terminal 1 (in step S16).

In the client terminal 1, the concealed data generator 12 generates information to be registered (in step S17). In this case, the concealed data generator 12 generates a vector (T, K, 0) obtained by attaching, to data obtained by combining the biometric data T and the key K, "0" as the last component of the combined data.

Then, the concealed data generator 12 conceals the information to be registered (in step S18). In this case, the concealed data generator 12 generates the concealed vector H obtained by adding the generated vector (T, K, 0) to the product of the random number lattice vector (lattice element) $b_1$ and a random number. If the random number is $r_1$, the concealed vector H is expressed by (T, K, 0)+$r_1 \times b_1$.

Then, the registration requester 11 transmits the concealed vector H to the concealed data matching device 3 in order to request the concealed data matching device 3 to register the concealed vector H or the information concealed by the concealed data generator 12 and to be registered (in step S19). As a result, the concealed vector H is registered in the database 330 of the concealed data matching device 3.

Sequence of Process of Matching Concealed Data

Figure 6:
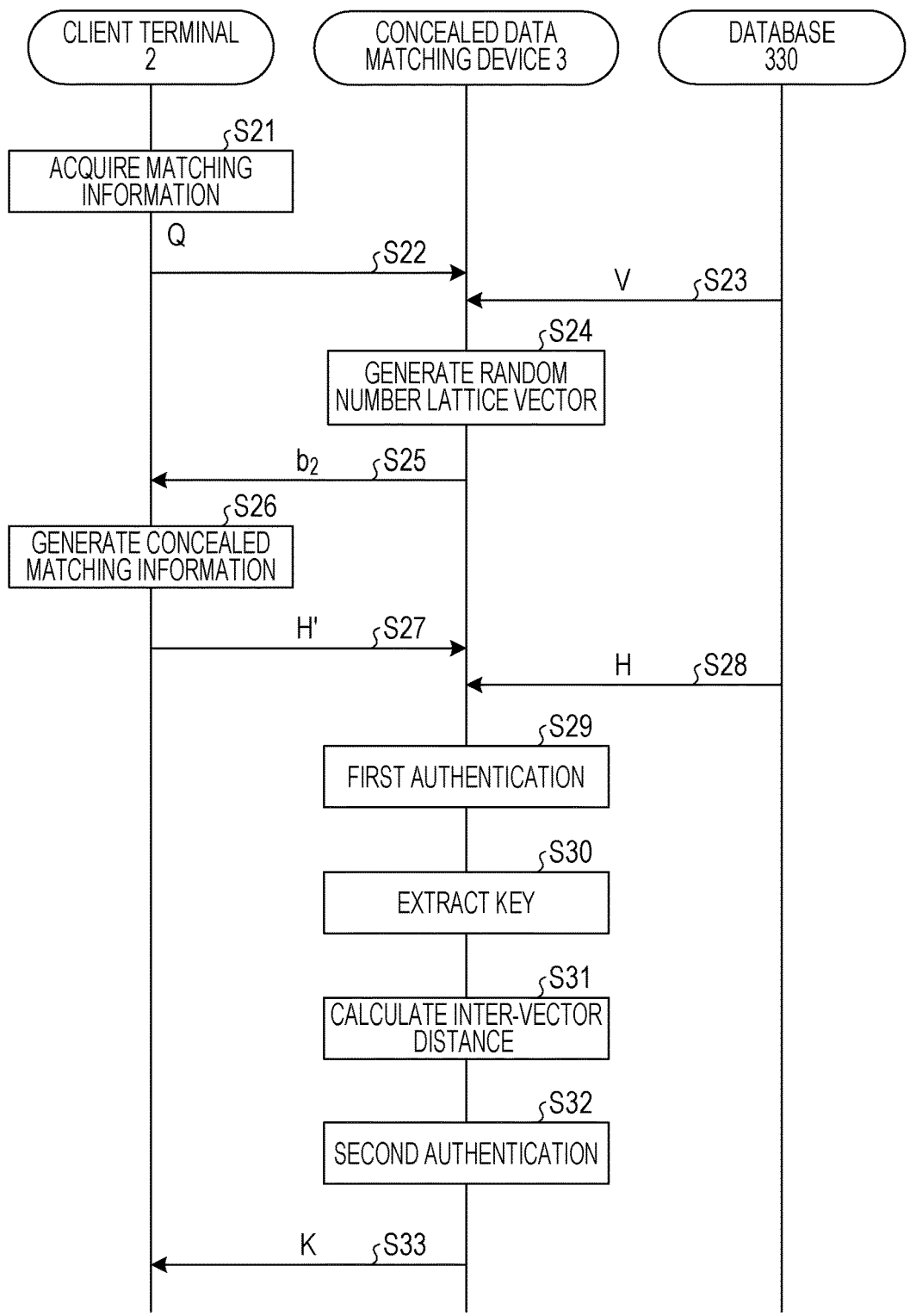
FIG. 6 is a diagram illustrating a sequence of a process of matching concealed data according to the embodiment.

Next, a sequence of a process of matching concealed data is described with reference to FIG. 6. FIG. 6 is a diagram illustrating the sequence of the process of matching concealed data. In FIG. 6, the matching data 211 of the client is indicated by Q, the key 112 specific to the client is indicated by K, the approximate determination matrix 331 is indicated by V, and concealed vectors are indicated by H' and H.

In the client terminal 2, the matching requester 21 acquires information to be matched (in step S21). In this case, the matching requester 21 acquires the matching data Q as the information to be matched. Then, the matching requester 21 requests the concealed data matching device 3 to crosscheck the matching data Q (in step S22).

In the concealed data matching device 3, the matching request receiver 321 that received the matching request from the client terminal 2 acquires the approximate determination matrix V from the database 330 (in step S23). Then, the matching request receiver 321 generates a random number lattice vector (in step S24). In this case, the matching request receiver 321 calculates a linear combination expressed by the sum of products of the row vectors of the read approximate determination matrix V and certain integers. The calculated linear combination is the random number lattice vector $b_2$ and is the lattice element. Then, the matching request receiver 321 transmits the calculated random number lattice vector (lattice element) $b_2$ to the client terminal 2 (in step S25). In this case, $b_2$ and $b_1$ are different from each other.

In the client terminal 2, the concealed data generator 22 generates concealed matching information (in step S26). In this case, the concealed data generator 22 generates a vector (Q, 0, 0) obtained by attaching "0s" to the matching data Q. Then, the concealed data generator 22 generates the concealed vector H' obtained by adding the generated vector (Q, 0, 0) to the product of the random number lattice vector (lattice element) $b_2$ and a random number. If the random number is $r_2$, the concealed vector H' is expressed by (Q, 0, 0)+$r_2 \times b_2$. Then, the matching requester 21 transmits the concealed vector H' to the concealed data matching device 3 to request the concealed data matching device 3 to crosscheck the concealed vector H' (in step S27).

In the concealed data matching device 3, the calculator 322 acquires the concealed vector H from the database 330 (in step S28). Then, the first determiner 323 uses a remainder vector calculated from a differential vector between the concealed vector H' requested to be matched and the acquired concealed vector H and executes first authentication to crosscheck the concealed vector H' with the concealed vector H (in step S29). In this case, the first determiner 323 determines whether or not the last component of the remainder vector is "0". If the last component of the remainder vector is "0", the first determiner 323 determines that the matching data Q is approximate to the registered biometric data T of the client. On the other hand, if the last component of the remainder vector is not "0", the first determiner 323 determines that the matching data Q is not approximate to the registered biometric data T of the client.

If the first determiner 323 determines that the matching data Q is approximate to the registered biometric data T of the client, the key output section 326 extracts the key K specific to the client from the remainder vector (in step S30). If the first determiner 323 determines that the matching data Q is approximate to the registered biometric data T of the client, the distance calculator 324 calculates, from the remainder vector, an inter-vector distance between the registered biometric information and the biometric information to be matched (in step S31). The second determiner 325 executes second authentication to determine the similarity between the registered biometric data 111 of the client and the matching data 211 based on the magnitude relationship between the inter-vector distance calculated by the distance calculator 324 and the authentication threshold stored in the threshold information 333 (in step S32). In this case, if the inter-vector distance is equal to or smaller than the authentication threshold, the second determiner 325 determines that the matching data 211 is approximate to the registered biometric data 111 of the client. On the other hand, if the inter-vector distance is larger than the authentication threshold, the second determiner 325 determines that the matching data 211 is not approximate to the registered biometric data 111 of the client.

If the first and second determiners 323 and 325 determine that the matching data 211 is approximate to the biometric data 111, the key output section 326 transmits the extracted key K to the client terminal 2 that requested the matching (in step S33).

Thus, after that, the client terminal 2 may use the extracted key K specific to the client to check the authentication. As an example, if the extracted key K specific to the client is a secret key, the client terminal 2 may use the secret key and a public key stored in advance to check the authentication based on a public key authentication scheme.

In addition, the concealed data matching device 3 may enable biometric data to satisfy a diversity property in the key binding scheme that is one of the template-protected biometric authentication techniques. The diversity property is one of security requirements and is a property in which converted templates do not cross-match the biometric data between multiple databases. Specifically, the property indicates that the same biometric information does not have any common features with the converted templates stored in the multiple databases. The concealed data matching device 3 generates the concealed vector H to be registered in the database 330, based on the approximate determination matrix V for the biometric data T and the key K specific to the client. It is assumed that concealed vectors $H_1$ and $H_2$ are generated from different two approximate determination matrices $V_1$ and $V_2$ for the biometric data T and the key K specific to the client. If $b_1$ indicates a lattice element generated from the approximate determination matrix $V_1$, the concealed vector $H_1$ generated from the approximate determination matrix $V_1$ is expressed by (T, K, 0)+$r_1 \times b_1$. If $b_2$ indicates a lattice element generated from the approximate determination matrix $V_2$, the concealed vector $H_2$ generated from the approximate determination matrix $V_2$ is expressed by (T, K, 0)+$r_2 \times b_2$. In this case, since the approximate determination matrices $V_1$ and $V_2$ are different from each other, $b_1$ and $b_2$ are different from each other and common information is not acquired from the two concealed vectors $H_1$ and $H_2$. Thus, if approximate determination matrices $V_1$ and $V_2$ are different between systems, concealed vectors $H_1$ and $H_2$ do not cross-match between multiple databases for the biometric data T and the key K specific to the client or the diversity property is satisfied.

Specific Examples of Processes of Registering and Matching Concealed Data

Next, processes of registering and matching concealed data according to the embodiment are described using specific examples. It is assumed that the concealed data matching system 9 uses three-dimensional data as biometric data. For example, it is assumed that first user's biometric data T input to the client terminal 1 is a three-dimensional vector [123, 512, 120] and that the key K is "6497". In addition, it is assumed that the approximate determination matrix V illustrated in FIG. 2 is generated by the concealed data matching device 3.

Specific Example of Process of Registering Concealed Data

The concealed data matching device 3 that received a request to register the biometric data T and the key K from the client terminal 1 treats the row vectors of the approximate determination matrix V as row vectors $v_1$ to $v_5$. Then, the concealed data matching device 3 calculates a linear combination $b_1$ expressed by the sum of products of the row vectors $v_1$ to $v_5$ and certain integers $c_1$ to $c_5$. If 2, 3, −5, −1, and 5 are selected as the integers $c_1$, $c_2$, $c_3$, $c_4$, and $c_5$, respectively, the linear combination $b_1$ is expressed by the following Equation (5).

$$b_1 = 2 \times v_1 + 3 \times v_2 - 5 \times v_3 - v_4 + 5 \times v_5 = [40, 60, -100, -19999, 686] \quad \text{Equation (5)}$$

Then, the concealed data matching device 3 transmits the calculated linear combination $b_1$ to the client terminal 1.

The client terminal 1 that received the linear combination $b_1$ generates a concealed vector H obtained by adding, to the product of the linear combination $b_1$ and a random number $r_1$, a vector (T, K, 0) obtained by attaching "0" as the last component of data obtained by combining the biometric data T and the key K to the combined data. In this case, if the random number $r_1$ selected by the client is "7", the concealed vector H is expressed by the following Equation (6).

$$H = [T, K, 0] + r_1 \times b_1 = [403, 932, -580, -133496, 4802] \quad \text{Equation (6)}$$

Then, the client terminal 1 transmits the calculated concealed vector H to the concealed data matching device 3. The concealed data matching device 3 registers the concealed vector H in the database 330.

First Specific Example of Process of Matching Concealed Data

As one example, it is assumed that matching data Q1 that is first user's biometric data input to the client terminal 2 upon the matching is [122, 514, 124].

The concealed data matching device 3 that received a request to crosscheck the matching data Q1 from the client terminal 2 treats the row vectors of the approximate determination matrix V as the row vectors $v_1$ to $v_5$. Then, the concealed data matching device 3 calculates a linear combination $b_2$ expressed by the sum of products of the row vectors $v_1$ to $v_5$ and certain integers $c'_1$ to $c'_5$. If 5, −2, 7, 0, and 1 are selected as $c'_1$, $c'_2$, $c'_3$, $c'_4$, and $c'_5$, respectively, the linear combination $b_2$ is expressed by the following Equation (7).

$$b_2 = 5 \times v_1 - 2 \times v_2 + 7 \times v_3 + v_5 = [100, -40, 140, 62, 128] \quad \text{Equation (7)}$$

Then, the concealed data matching device 3 transmits the calculated linear combination $b_2$ to the client terminal 2.

The client terminal 2 that received the linear combination $b_2$ generates a concealed vector H1 obtained by adding, to the product of the linear combination $b_2$ and a random number $r_2$, a vector [Q1, 0, 0] obtained by attaching "0s" to the matching data Q1. In this case, if the random number $r_2$ selected by the client is 123, the concealed vector H1 is expressed by the following Equation (8).

$$H1 = [Q1, 0, 0] + r_2 \times b_2 = [12422, -4406, 17344, 7626, 15744] \quad \text{Equation (8)}$$

The client terminal 2 transmits the calculated concealed vector H1 to the concealed data matching device 3 in order to request the concealed data matching device 3 to crosscheck the concealed vector H1.

Subsequently, the concealed data matching device 3 executes the first authentication. The concealed data matching device 3 calculates a remainder vector by dividing a differential vector $z_1$ between the concealed vector H1 requested to be matched and the registered concealed vector H by the approximate determination matrix V. In this case, the differential vector $z_1 = (H - H1)$ is calculated, and the remainder vector obtained by the division using the approximate determination matrix V as a divisor is calculated according to the following Equation (9). In Equation (9), $[z_1 \times V^{-1}]$ indicates an integer vector in which each element of $z_1 \times V^{-1}$ is rounded into integer and that is the closest integer vector to $z_1 \times V^{-1}$.

$$z_1 \bmod V = z_1 - [z_1 \times V^{-1}] \times V = [1, -2, -4, 6497, 0] \quad \text{Equation (9)}$$

Since the last component of the remainder vector calculated from the concealed vector H1 is "0", the concealed data matching device 3 determines that the matching data Q1 is approximate to the registered biometric data T of the client and that the first authentication was successful. After the successful first authentication, the concealed data matching device 3 extracts the key K of the second last component of the remainder vector. In this case, "6497" is extracted as the key K.

Subsequently, the concealed data matching device 3 executes the second authentication. In this case, it is assumed that the concealed data matching device 3 executes the second authentication based on a Euclidean distance d between the registered biometric data T of the client and the matching data Q and that the authentication stored in the threshold information 333 is "10". Specifically, it is assumed that the concealed data matching device 3 determines that the second authentication was successful if the following Equation (10) is established for T−Q=[x, y, z], and it is assumed that the concealed data matching device 3 determines that the second authentication failed if the following Equation (10) is not established for T−Q=[x, y, z].

$$d^2 = x^2 \times y^2 \times z^2 \leq 10^2 \quad \text{Equation (10)}$$

The concealed data matching device 3 extracts T−Q1=[1, −2, −4] from Equation (9) and calculates $d_1^2 = 21$ from Equation (10) as the second authentication. Since $d_1^2 \leq 100$, the concealed data matching device 3 determines that the second authentication was successful.

Then, if the first authentication and the second authentication were successful, the concealed data matching device 3 transmits "6497" as the key K to the client terminal 2 that requested the matching.

Second Specific Example of Process of Matching Concealed Data

As another example, it is assumed that matching data Q2 that is second user's biometric data input to the client terminal 2 upon the matching is [121, 555, 123].

The concealed data matching device 3 that received a request to crosscheck the matching data Q2 from the client terminal 2 treats the row vectors of the approximate determination matrix V as the row vectors $v_1$ to $v_5$. Then, the concealed data matching device 3 calculates the linear combination $b_2$ expressed by the sum of the products of the row vectors $v_1$ to $v_5$ and the certain integers $c'_1$ to $c'_5$. In this case, the linear combination $b_2$ is expressed by the aforementioned Equation (7).

Then, the concealed data matching device 3 transmits the calculated linear combination $b_2$ to the client terminal 2.

The client terminal 2 that received the linear combination $b_2$ generates a concealed vector H2 obtained by adding, to the product of the linear combination $b_2$ and a random number $r_3$, a vector [Q2, 0, 0] obtained by attaching "0s" to the matching data Q2. In this case, if the random number $r_3$ selected by the client is "−17", the concealed vector H2 is expressed by the following Equation (11).

$$H2=[Q2,0,0]+r_3 \times b_2=[-1579,1235,-2257,-1054,-2176] \quad \text{Equation (11)}$$

Then, the client terminal 2 transmits the calculated concealed vector H2 to the concealed data matching device 3 in order to request the concealed data matching device 3 to crosscheck the concealed vector H2.

Subsequently, the concealed data matching device 3 executes the first authentication. The concealed data matching device 3 calculates a remainder vector by dividing a differential vector $z_2$ between the concealed vector H2 requested to be matched and the registered concealed vector H by the approximate determination matrix V. In this case, the differential vector $z_2=(H-H2)$ is calculated, and the remainder vector calculated by the division using the approximate determination matrix V as a divisor is calculated according to the following Equation (12).

$$z_2 \bmod V = z_2 - [z_2 \times V^{-1}] \times V = [2,-3,-3,6505,6] \quad \text{Equation (12)}$$

Since the last component of the remainder vector calculated from the concealed vector H2 is not "0", the concealed data matching device 3 determines that the matching data Q2 is not approximate to the registered biometric data T of the client. Then, the concealed data matching device 3 transmits information indicating that the matching failed to the client terminal 2 that requested the matching.

Third Specific Example of Process of Matching Concealed Data

As another example, it is assumed that matching data Q3 that is second user's biometric data input to the client terminal 2 upon the matching is [129, 504, 122].

The concealed data matching device 3 that received a request to crosscheck the matching data Q3 from the client terminal 2 treats the row vectors of the approximate determination matrix V as the row vectors $v_1$ to $v_5$. Then, the concealed data matching device 3 calculates the linear combination $b_2$ expressed by the sum of the products of the row vectors $v_1$ to $v_5$ and the certain integers $c'_1$ to $c'_5$. In this case, the linear combination $b_2$ is expressed by the aforementioned Equation (7).

Then, the concealed data matching device 3 transmits the calculated linear combination $b_2$ to the client terminal 2.

The client terminal 2 that received the linear combination $b_2$ generates a concealed vector H3 obtained by adding, to the product of the linear combination $b_2$ and a random number $r_4$, a vector [Q3, 0, 0] obtained by attaching "0s" to the matching data Q3. In this case, if the random number $r_4$ selected by the client is "26", the concealed vector H3 is expressed by the following Equation (13).

$$H3=[Q3,0,0]+r_4 \times b_2=[2729,-536,3762,1612,3328] \quad \text{Equation (13)}$$

Then, the client terminal 2 transmits the calculated concealed vector H3 to the concealed data matching device 3 in order to request the concealed data matching device 3 to crosscheck the concealed vector H3.

Subsequently, the concealed data matching device 3 executes the first authentication. The concealed data matching device 3 calculates a remainder vector by dividing a differential vector $z_3$ between the concealed vector H3 requested to be matched and the registered concealed vector H by the approximate determination matrix V. In this case, the differential vector $z_3=(H-H3)$ is calculated, and the remainder vector obtained by the division using the approximate determination matrix V as a divisor is calculated according to the following Equation (14).

$$z_3 \bmod V = z_3 - [z_3 \times V^{-1}] \times V = [-6,8,-2,6497,0] \quad \text{Equation (14)}$$

Since the last component of the remainder vector calculated from the concealed vector H3 is "0", the concealed data matching device 3 determines that the matching data Q3 is approximate to the registered biometric data T of the client and that the first authentication was successful. After the successful first authentication, the concealed data matching device 3 extracts the key K of the second last component of the remainder vector. In this case, "6497" is extracted as the key K.

Subsequently, the concealed data matching device 3 executes the second authentication. The concealed data matching device 3 extracts T−Q3=[−6, 8, −2] from Equation (14) and calculates $d_3^2=104$ from Equation (10). Since $d_3^2>100$, the concealed data matching device 3 determines that the second authentication failed. In this case, the concealed data matching device 3 transmits, to the client terminal 2, information indicating that the second authentication failed.

According to the aforementioned embodiment, the concealed data matching device 3 stores, in the storage section 33, concealed data 332 obtained by concealing registered data and key data based on a first random number and a linear combination of row vectors of an approximate determination matrix 331 obtained by attaching a random number vector as the last column of the matrix to a matrix having, as diagonal elements, a threshold for the key data and a threshold to be used to determine the similarity between matching data and the registered data. The concealed data matching device 3 acquires a concealed vector obtained by concealing the matching data based on a second linear combination of the row vectors of the approximate determination matrix 331 and a second random number. The concealed data matching device 3 calculates a remainder vector that indicates a remainder obtained by dividing the difference between the concealed data 332 and the concealed vector by the approximate determination matrix 331. The concealed data matching device 3 determines the similarity between the registered data and the matching data based on the remainder vector. If the concealed data matching device 3 determines that the matching data is similar to the registered data, the concealed data matching device 3 extracts the key data from the remainder vector. The concealed data matching device 3 extracts a component of the remainder vector and calculates an inter-vector distance between the registered data and the matching data. The concealed data matching device 3 determines the similarity between the registered data and the matching data based on the magnitude relationship between the inter-vector distance and an authentication threshold. Thus, the concealed data matching device 3 may flexibly support the authentication of biometric information of various types and improve the accuracy of the authentication. For example, the concealed data matching device 3 may execute the authentication based on various standards in the key binding scheme by lattice element addition and achieve the authentication with accuracy equivalent to that of existing biometric authentication while protecting biometric information. In addition, the concealed data matching device 3 may support a change in the authentication threshold using the single approximate determination matrix 331 as a template and execute the authentication at a security level to be ensured without taking time and effort to reregister the template or holding multiple templates with different thresholds.

In addition, according to the aforementioned embodiment, in the concealed data matching device 3, the authentication threshold is reduced as the security level of the authentication is increased. If the inter-vector distance between the matching data and the registered data is smaller than the authentication threshold, the concealed data matching device 3 determines that the matching data is similar to the registered data. Thus, the concealed data matching device 3 may increase the security level of the authentication by reducing the authentication threshold.

In addition, according to the aforementioned embodiment, if the first determiner 323 and the second determiner 325 determine that the matching data is similar to the registered data, the concealed data matching device 3 outputs the extracted key to a source that requested the determination of the matching data. Thus, the source that requested the determination may use the received key to check the authentication.

The embodiment describes the case where the concealed data matching device 3 registers, in the database 330, the concealed data 332 obtained by concealing the biometric data 111 of the client and the key 112 and crosschecks the registered concealed data 332 with the concealed data obtained by concealing the matching data 211. The concealed data matching device 3, however, may register, in the database 330, multiple concealed data items 332 obtained by concealing biometric data 111 of multiple clients and multiple keys 112. In this case, when receiving a request to execute the matching, the concealed data matching device 3 selects the registered concealed data items 332 one by one and crosschecks the selected registered concealed data items 332 with the concealed data obtained by concealing the matching data 211 requested to be matched. If the concealed data matching device 3 determines that the matching data 211 is approximate to a concealed data item 332 as a result of the matching, the concealed data matching device 3 extracts a key 112 from a remainder vector generated upon the matching and transmits the extracted key 112 to a source that requested the matching.

In addition, the embodiment describes the case where the concealed data matching device 3 determines whether or not the last component of the remainder vector generated upon the matching is "0" and whether or not the matching data 211 is approximate to the registered biometric data 111 of the client. The concealed data matching device 3, however, is not limited to this. The concealed data matching device 3 may determine whether or not multiple components of the remainder vector are "0" and whether or not the matching data 211 is approximate to the registered biometric data 111 of the client.

For example, if the biometric data to be subjected to the determination is information including n components or the biometric data 111 is n-dimensional information, the approximate determination matrix generator 312 generates an n×n diagonal matrix. In addition, the approximate determination matrix generator 312 attaches, to the n×n diagonal matrix, a row vector whose components indicate "0" as elements of an (n+1)-th row of the matrix. Then, the approximate determination matrix generator 312 attaches, as an (n+1)-th column, a column vector obtained by combining an n-dimensional random number vector with the threshold for the key 112 to the matrix. Then, the approximate determination matrix generator 312 attaches a row vector whose components indicate "0" as an (n+2)-th row to the matrix. Then, the approximate determination matrix generator 312 attaches an (n+2)-dimensional random number vector as an (n+2)-th column to the matrix and thereby generates the (n+2)×(n+2) matrix.

In addition, the approximate determination matrix generator 312 may attach a vector whose components indicate "0" as an (n+3)-th row to the matrix. Then, the approximate determination matrix generator 312 may attach an (n+3)-dimensional random number vector as an (n+3)-th column to the matrix and thereby generate the (n+3)×(n+3) approximate determination matrix 331.

Then, the concealed data matching device 3 executes the same processes as those described in the embodiment and calculates an (n+3)-dimensional remainder vector by the division using the approximate determination matrix 331 as a divisor. Then, the concealed data matching device 3 may make the approximate determination by determining whether or not all components from an (n+2)-dimensional component of the remainder vector to an (n+3)-dimensional component of the remainder vector are "0". Thus, the concealed data matching device 3 may improve the accuracy of the approximate determination. The approximate determination matrix generator 312 may generate an (n+m)×(n+m) approximate determination matrix 331 (m is a natural number larger than 3) in the same manner as described above and further improve the accuracy of the approximate determination.

In addition, the embodiment describes the case where, if the first determiner 323 determines that the matching data is approximate to the registered data, the concealed data matching device 3 extracts the key 112 of the (n+1)-th component from the remainder vector. However, if the first and second determiners 323 and 325 determine that the matching data is approximate to the registered data, the concealed data matching device 3 may extract the key 112.

In addition, the embodiment describes the case where the concealed data matching device 3 is used for the approximate determination of the biometric data 111. The concealed data matching device 3, however, is not limited to this and may be used for the determination of the similarity between concealed confidential documents. For example, the client terminal 1 extracts characters having a characteristics or a sentence having a characteristics from a confidential document and generates a feature amount vector indicating a feature amount of the extracted characters or sentence. Then, the client terminal 1 executes the same processes as those described in the embodiment, generates a concealed vector obtained by concealing the generated feature amount vector and a key, and registers the generated concealed vector in the database 330 of the concealed data matching device 3. Then, the concealed data matching device 3 executes the same processes as those described in the embodiment and thereby crosschecks the registered concealed vector with a concealed vector generated by the client terminal 2 to conceal the feature amount vector to be matched.

The concealed data matching device 3 may be achieved by installing the aforementioned functions such as the registering section 31 and the matching determining section 32 in an information processing device such as an existing personal computer or an existing workstation.

The illustrated constituent elements of the devices may not be physically configured in the same manner as illustrated in the drawings. Specifically, specific forms of distribution and integration of the devices are not limited to those illustrated in the drawings, and all or part of the constituent elements of the devices may be functionally or physically distributed or integrated in arbitrary units depending on various loads or use conditions. For example, the random number generator 311 and the approximate determination matrix generator 312 may be integrated as a single unit. On the other hand, the approximate determination matrix generator 312 may be separated into a first setting unit configured to set the thresholds indicating the approximate range and the threshold for the key in the matrix and a second setting unit configured to set the random numbers. In addition, the database 330 may be included in an external device connected to the concealed data matching device 3 or may be connected to the concealed data matching device 3 via the network.

Figure 7:
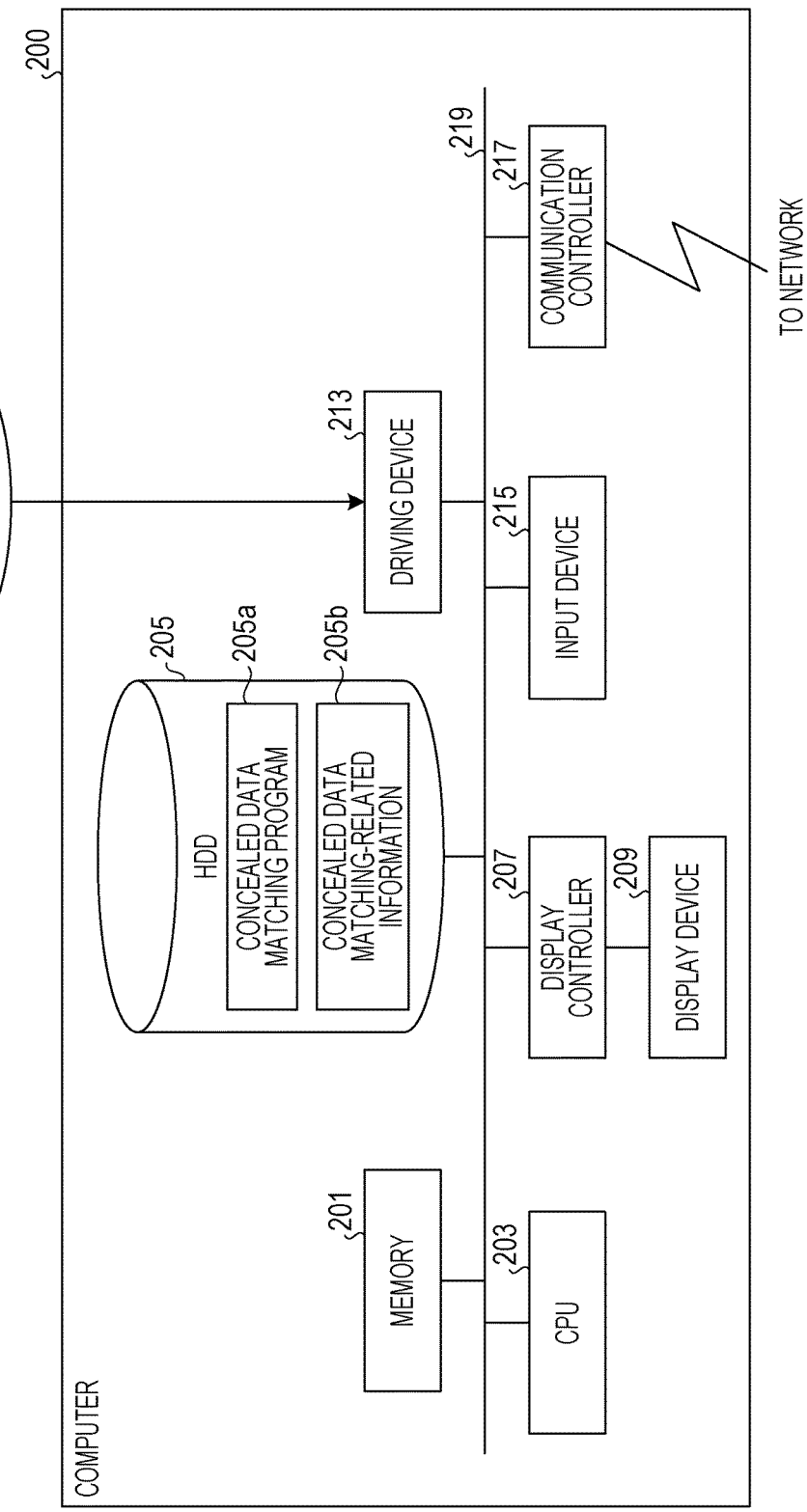
FIG. 7 is a diagram illustrating an example of a computer that executes a concealed data matching program.

In addition, the various processes described in the embodiment may be achieved by causing a computer such as a personal computer or a workstation to execute a program prepared in advance. An example of the computer that executes the concealed data matching program that achieves the same functions as those of the concealed data matching device 3 is described below. FIG. 7 is a diagram illustrating the example of the computer that executes the concealed data matching program.

As illustrated in FIG. 7, a computer 200 includes a CPU 203 configured to execute various arithmetic processes, an input device 215 configured to receive input of data from a user, and a display controller 207 configured to control a display device 209. In addition, the computer 200 includes a driving device 213 configured to read a program from a storage medium and a communication controller 217 configured to transmit and receive data to and from another computer via a network. Furthermore, the computer 200 includes an HDD 205 and a memory 201 configured to temporarily store information of various types. The memory 201, the CPU 203, the HDD 205, the display controller 207, the driving device 213, the input device 215, and the communication controller 217 are connected to each other via a bus 219.

The driving device 213 is used for a movable disk 211, for example. The HDD 205 stores a concealed data matching program 205a and concealed data matching-related information 205b.

The CPU 203 reads the concealed data matching program 205a, loads the concealed data matching program 205a into the memory 201, and executes the concealed data matching program 205a as a process. The process corresponds to the functional sections of the concealed data matching device 3. The concealed data matching-related information 205b corresponds to the approximate determination matrix 331, the concealed data 332, and the threshold information 333. For example, information of various types, such as the concealed data matching program 205a, is stored in the movable disk 211.

The concealed data matching program 205a may not be stored in the HDD 205 in an initial state. For example, the concealed data matching program 205a may be stored in "portable physical media" that are to be inserted in the computer 200 and are a flexible disk (FD), a CD-ROM, a DVD, a magneto-optical disc, an IC card, and the like. The computer 200 may read the concealed data matching program 205a from the portable physical media and execute the concealed data matching program 205a.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A concealed data matching device configured to be coupled to at least one terminal device, the concealed data matching device comprising:
   a memory, and
   a processor coupled to the memory and configured to execute a process including:
      generating a determination matrix;
      generating a first random number vector based on the determination matrix;
      transmitting the first random number vector to a first terminal device;
      receiving, from the first terminal device, a first concealed vector obtained by concealing first biometric data and key data that is based on the first random number vector;
      registering, in the memory, the first concealed vector;
      generating a second random number vector based on the determination matrix;
      transmitting the second random number vector to a second terminal device;
      receiving, from the second terminal device, a second concealed vector obtained by concealing second biometric data based on the second random number vector;
      calculating a remainder vector indicating a remainder obtained by dividing a difference between the first concealed vector and the second concealed vector by the determination matrix;
      determining a similarity between the first biometric data and the second biometric data based on the remainder vector;
      extracting the key data from the remainder vector when the second biometric data is determined to be similar to the first biometric data based on the remainder vector;
      calculating an inter-vector distance between the first biometric data and the second biometric data based on the remainder vector;
      determining the similarity between the first biometric data and the second biometric data based on the inter-vector distance; and
      transmitting the key data to the second terminal device when the second biometric data is determined to be similar to the first biometric data based on the inter-vector distance.

2. The concealed data matching device according to claim 1, wherein
   in the determining of the similarity between the first biometric data and the second biometric data based on the inter-vector distance, the inter-vector distance is compared with a first value, and the first value is reduced as a security level of authentication is increased, and wherein when the inter-vector distance is smaller than the first value, in the determining of the similarity based on the inter-vector distance, the second biometric data is determined to be similar to the first biometric data.

3. The concealed data matching device according to claim 1, wherein the second terminal device executes an authentication check of the second biometric information using the key data transmitted from the concealed data matching device.

4. The concealed data matching device according to claim 1, wherein the first terminal device is a different device from the second terminal device.

5. A computer-readable and non-transitory storage medium storing a concealed data matching program for causing a computer to execute a process, the computer being configured to be coupled to at least one terminal device, the process comprising:

generating a determination matrix;

generating a first random number vector based on the determination matrix;

transmitting the first random number vector to a first terminal device;

receiving, from the first terminal device, a first concealed vector obtained by concealing first biometric data and key data that is based on the first random number vector;

registering, in a memory, the first concealed vector;

generating a second random number vector based on the determination matrix;

transmitting the second random number vector to a second terminal device;

receiving, from the second terminal device, a second concealed vector obtained by concealing second biometric data based on the second random number vector;

calculating a remainder vector indicating a remainder obtained by dividing a difference between the first concealed vector and the second concealed vector by the determination matrix;

determining a similarity between the first biometric data and the second biometric data based on the remainder vector;

extracting the key data from the remainder vector when it is determined that the second biometric data is similar to the first biometric data based on the remainder vector;

calculating an inter-vector distance between the first biometric data and the second biometric data based on the remainder vector; and determining the similarity between the first biometric data and the second biometric data based on the inter-vector distance; and transmitting the key data to the second terminal device when the second biometric data is determined to be similar to the first biometric data based on the inter-vector distance.

6. A concealed data matching method for causing a computer to execute a process, the computer being configured to be coupled to at least one terminal device, the process comprising:

generating a determination matrix;

generating a first random number vector based on the determination matrix;

transmitting the first random number vector to a first terminal device;

receiving, from the first terminal device, a first concealed vector obtained by concealing first biometric data and key data that is based on the first random number vector;

registering, in a memory, the first concealed vector;

generating a second random number vector based on the determination matrix;

transmitting the second random number vector to a second terminal device;

receiving, from the second terminal device, a second concealed vector obtained by concealing second biometric data based on the second random number vector;

calculating a remainder vector indicating a remainder obtained by dividing a difference between the first concealed vector and the second concealed vector by the determination matrix;

determining a similarity between the first biometric data and the second biometric data based on the remainder vector;

extracting the key data from the remainder vector when it is determined that the second biometric data is similar to the first biometric data based on the remainder vector;

calculating an inter-vector distance between the first biometric data and the second biometric data based on the remainder vector;

determining the similarity between the first biometric data and the second biometric data based on the inter-vector distance; and transmitting the key data to the second terminal device when the second biometric data is determined to be similar to the first biometric data based on the inter-vector distance.

* * * * *